United States Patent [19]
Takizawa et al.

[11] Patent Number: 5,518,671
[45] Date of Patent: May 21, 1996

[54] METHOD OF SETTING MOLDING CONDITIONS FOR AN INJECTION MOLDING MACHINE

[75] Inventors: Michiaki Takizawa; Fumio Shiozawa; Takashi Magario; Makoto Takeuchi; Masatake Hoshina; Minoru Yamazaki; Toshimi Kato, all of Nagano, Japan

[73] Assignee: Nissei Plastic Industrial Co., Ltd., Nagano, Japan

[21] Appl. No.: 325,168

[22] Filed: Oct. 20, 1994

[30] Foreign Application Priority Data

Oct. 20, 1993 [JP] Japan ................................. 5-285706
Oct. 20, 1993 [JP] Japan ................................. 5-285707
Oct. 20, 1993 [JP] Japan ................................. 5-285708

[51] Int. Cl.$^6$ ................................. B29C 45/76
[52] U.S. Cl. ................ 264/40.1; 264/40.5; 264/40.6; 364/476; 425/145
[58] Field of Search .................. 264/40.1, 40.5, 264/40.6, 328.1; 425/135, 145, 149; 364/476

[56] References Cited

U.S. PATENT DOCUMENTS 5,225,122 7/1993 Inaba et al. ............................. 264/40.1
5,350,546 9/1994 Takeuchi et al. ....................... 264/40.1

FOREIGN PATENT DOCUMENTS 2-98419  4/1990  Japan.
4-201314 7/1992  Japan.
169507   7/1993  Japan.

Primary Examiner—Jill L. Heitbrink
Attorney, Agent, or Firm—Birch, Stewart, Kolasch & Birch

[57] ABSTRACT

A method of setting molding conditions for an injection molding machine 1 using a mold 2 whose specifications data are unclear included three setting processes. In the first setting process A, by inputting known data into controller 3, the molding conditions based on a data base prepared in advance and said input known data are set. In the second setting process B, injection molding is performed according to prescribed molding conditions pre-selected concerning injection pressure P, injection speed V and the injection start position of screw 4, and then, based on the product just molded, injection pressure P is altered, to set said altered injection pressure P, injection speed V and proper pre-feed measurement value Md as molding conditions. In the third setting process C, injection molding is performed according to molding conditions obtained from said second setting process B, and subsequently, taking into account the findings from the product just molded, said molding conditions are adjusted. In this manner, even an unskilled operator is allowed to undertake setting molding conditions reliably and with great ease for an injection molding machine loaded with a set of molds whose specifications data are unclear.

13 Claims, 10 Drawing Sheets

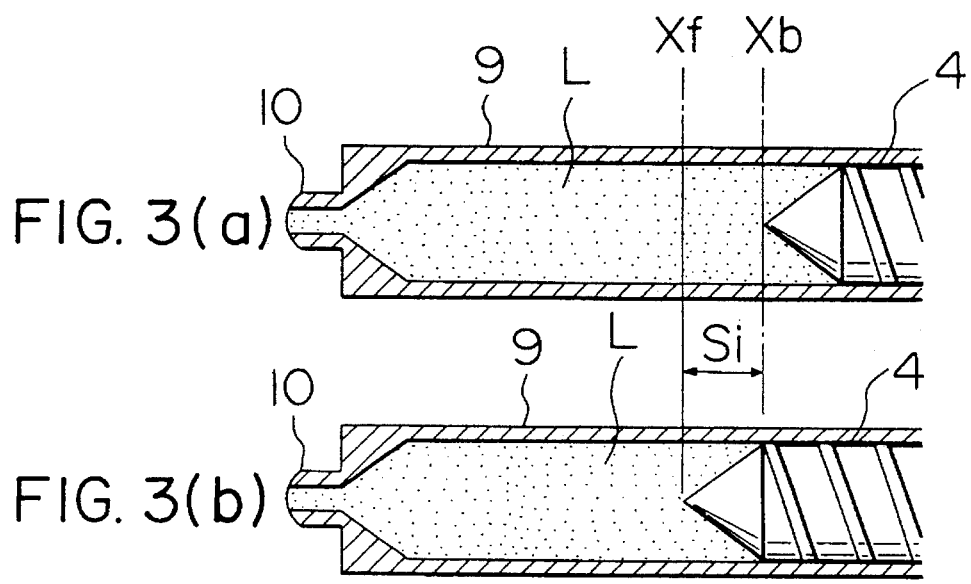
FIG. 3(a)
FIG. 3(b)
FIG. 4
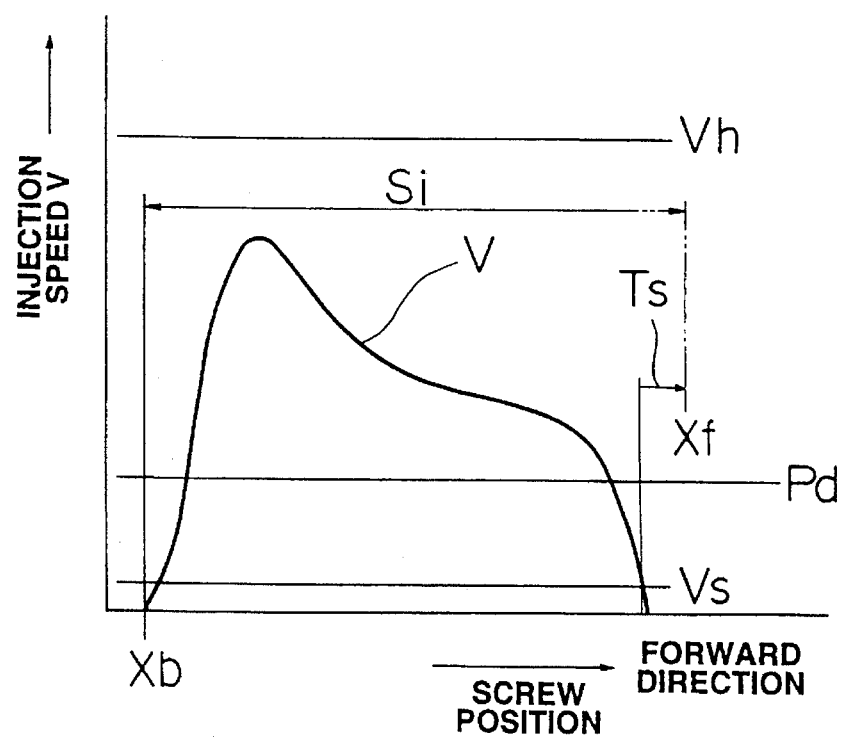

FIG.12
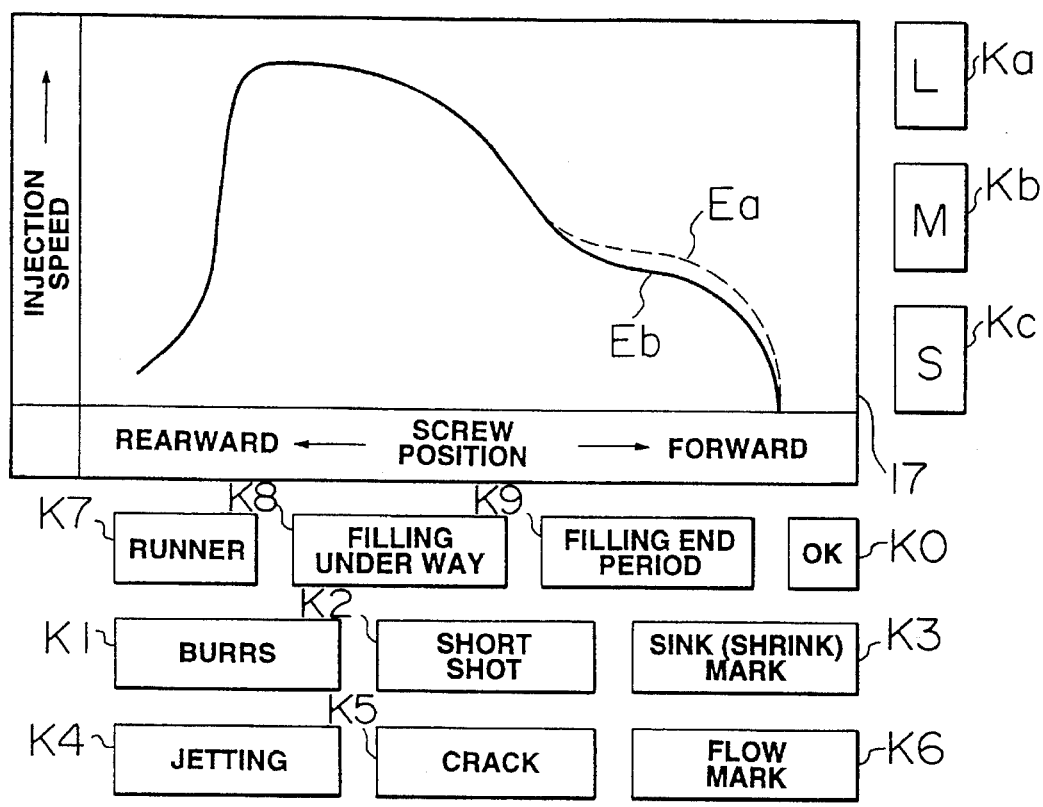
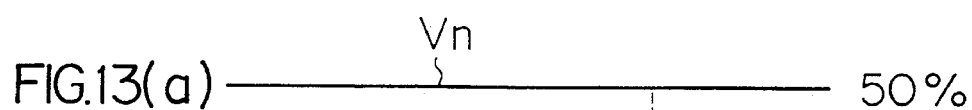
FIG.13(a)
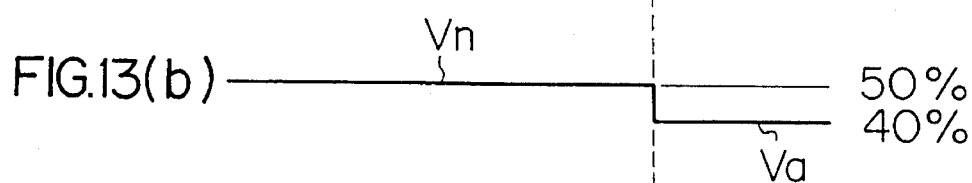
FIG.13(b)
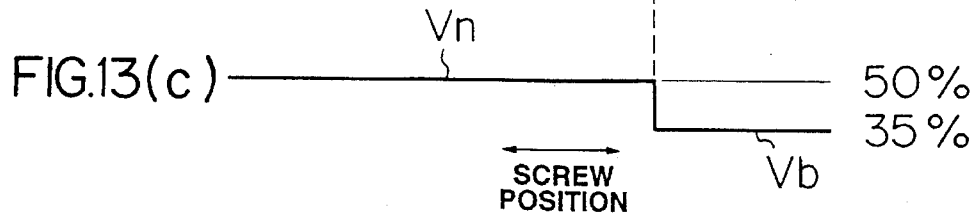
FIG.13(c)

METHOD OF SETTING MOLDING CONDITIONS FOR AN INJECTION MOLDING MACHINE

FIELD OF THE INVENTION

The present invention relates to a method of setting molding conditions which is applied for the case where an injection molding machine is brought into run, using a mold with no data concerning its specification.

DESCRIPTION OF THE RELEVANT ART

Generally, the molding conditions to be set for an injection molding machine ranges over a wide variety, and since respective molding conditions affect each other, the process of setting certain molding conditions for an injection molding machine requires considerable skill and experience, thus constituting a specialty job.

Therefore, so far, some methods and techniques for automating the process of setting molding conditions so that even unskilled and unexperienced operators could perform the setting precisely and with ease have been proposed.

For example, a method is disclosed in Japanese Patent Application Laid-Open No. 2 (1990)-98419, wherein by considering the data of an injection molding machine, the material data of the plastic used, the shape and other features of a product to be injection-molded, initial molding conditions are selected, while some defects conceivable with the product to be molded and causes attributable to each defect and countermeasures for such defects are stored to solve the defects based on those data.

Another method is disclosed in Japanese Patent Application Laid-Open No. 4 (1992)-201314, wherein a data table which stores various molding conditions and another data table which stores the priority of countermeasures concerning respective state of molding based on the knowhow of experienced operators, with the aim of rendering optimum the molded product conditions, are prepared, whereby molding conditions are changed according to these data tables and the consequences of test injection molding until a molded product with acceptable quality is available.

Further another method is disclosed in Japanese Patent Application Laid-Open No. 5 (1993)-169507, wherein from the data base of quality product molding conditions which has been prepared by accumulating the data of molding conditions of molded products with acceptable quality, the optimal molding conditions for the intended products are extracted or in case similar products are not available, setting rules of default are provided to set the initial conditions, and necessary molding conditions are set performing test injection based on the above.

Meanwhile, these conventional methods presuppose the availability of mold data relative to the in-mold cavity volume, etc. or the shape of molded product. Therefore, in such a case like the above, regarding measured values, etc., test molding can be performed by setting molding conditions somewhat provisional, as initial conditions.

However, when manufacturing products, if the manufacturer thereof has within his plant or shop the entire production process including mold designing, he is allowed to know the mold data relative to a cavity volume, and so forth by referring to a mold drawing, or a mold model, etc. But for those makers having only a production line, when they are entrusted with the manufacture of molded products there are many cases where they receive only a set of molds from their clients being therefore deprived of mold data.

When the mold data are not available, it is necessary for the operator to empirically or by intuition, set the initial molding conditions concerning injection speed, injection pressure, etc. through visual examination of the mold cavity, etc. and then, performing the molding by setting measured values somewhat below the actual figures and increasing gradually said values while observing state of filling of the molded product, necessitating to set the molding conditions on trial and error basis by repeating trial molding. The result is that the number of operators capable to perform such setting is limited and because even skilled operators cannot undertake such molding conditional setting easily, the setting, consumed long hours, lowered productivity, and increased production cost in addition to the waste of material and energy. Further, due to mistaken or incorrect setting, when measured value or injection pressure is set in excess, there is a fear that designating a right setpoint of each molding conditional is set in excess, there is a fear that the mold interior is applied with abnormal pressure and the molds may possibly be damaged.

SUMMARY OF THE INVENTION

An object of the present invention is to provide a method of setting molding conditions for an injection molding machine, allowing even an unskilled operator to undertake the setting of molding conditions with great ease and without fail for such an injection molding machine loaded with a set of molds whose specifications' data are unclear, whereby the setting time may be shortened, productivity may be raised, production cost may be reduced, and the saving of material and energy may be realized.

Another object of the present invention is to provide a method of setting molding conditions for an injection molding machines, for preventing molds from being damaged and further to improve the safety thereof by eliminating improper setting.

To achieve each of these objects, in the present invention, when setting molding conditions for injection molding machine 1 using a set of molds whose specifications data are unclear, a method is utilized which comprises a first setting process A wherein, by inputting known data to controller 3, the molding conditions based on the data base prepawed in advance and said known data are set; a second setting process B wherein injection molding is performed according to previously set certain molding conditions with injection pressure P, injection speed V and screw 4 injection start position, while altering injection pressure P, based on the molded product and setting molding conditions regarding injection pressure P, injection speed V and measurement value Md, and a third setting process C wherein injection molding is carried out based on the molding conditions obtained from the second setting process B while said molding conditions are subsequently adjusted based on the outcomes of the check done for the product molded.

First setting process A includes a process to set the molding condition associated with temperature by way of inputting at least the data relative to the kind of material selected for injection molding as known data into controller 3.

Further in second setting process B, by setting, as certain molding conditions, injection pressure P to be one of lower pressure side Pd, injection speed V to be one of higher speed side Vh, and the injection start position of screw 4 is likewise selected at the rearmost retreat position Xb, to perform injection molding. And as a measure corresponding to filling defect of molded product, injection pressure P is boosted in order to obtain a magnitude of injection pressure P serving to provide quality products and subsequently, a correction value of pressure involved by the change of injection speed, is added to or subtracted from above-obtained injection pressure P to set the injection pressure thus obtained as one molding condition. In this case, injection pressure P is altered as much as a pre-selected amount of change depending on the degree of defective filling, followed by repetitive cycles of retest injection molding which is done at altered injection pressure P until quality molded products are available. The correction value of pressure is selected in response to the fluctuations of pressure variable depending on the override characteristic of a machine drive. Further in the second setting process B, average injection speed Va is obtained from screw's injection stroke Si at which the machine has provided quality molded products and from injection speed V fluctuating during the period of screw's injection stroke Si, and average injection speed Va thus obtained above is set as one molding condition. In this case, the injection stroke Si is obtained in a way such when injection speed V (or injection pressure P) which produced quality products, falls below pre-selected setpoint Vs of speed (or setpoint Ps of pressure), namely after injection speed V (or injection pressure P) becomes below setpoint Vs of speed (or above setpoint Ps of pressure), injection finish position Xf after the lapse of pre-selected time Ts is detected, whereby injection stroke Si is calculated from the difference between screw's injection finish position Xf detected and rearmost retreat position Xb thereof. In addition, screw' injection stroke Si (=Xb−Xf) is calculated from the difference between injection finish position Xf and rearmost retreat position Xb, while measurement Md is calculated by adding cushion stroke Sc set in advance to set the measurement Md thus obtained as a molding condition.

In the meanwhile, third setting process C includes an adjusting process to adjust injection speed V or injection pressure P in the injection process to multi-steps injection speed or pressure. The adjusting process serves to change injection speed V or injection pressure P, among pre-selected different filling processes of a filling process which has generated defective filling; or, to be more precise, at this stage, injection speed V or injection pressure P is altered as much as the pre-selected amount of change, followed by repetitive remolding cycles until defective filling is eliminated.

As is clear from above, the present invention divides the setting process of molding conditions into a plurality of processes to perform setting step-by-step. First, in the setting process A, by inputting known data into input controller 3, molding conditions based on the data base prepared in advance and said entered known data are set. In this setting process, inputting known data into the controller alone automatically selects necessary molding conditions. For example, when known data concerning the kind of material selected for injection molding is inputted into controller 3 as a known data, the molding conditions concerning temperature (barrel cylinder temperature, mold temperature, etc.) are selected, based on the data, relative to the physical property and characteristic of a molding material, which have been prepared in advance as a data base. With first setting process A completed, injection molding machine is ready to start for basic run.

Next, in the second setting process B, certain provisional molding conditions relative to injection speed, injection pressure, and injection start position of screw 4 are selected; namely, the setting is performed by setting the injection pressure at one pressure value on the lower pressure side Pd, the injection speed likewise at one speed value Vh, on the higher pressure side, and the injection start position of screw 4 set at the rearmost retreat position Xb, respectively, to carry out injection molding under the above prescribed molding conditions. The product molded is visually examined, and injection pressure P is altered, according to the procedure in second setting process B referred to above while at the same time, the molding conditions relative to injection pressure P, injection speed V and measurement Md are selected. In this case, if the operator can judge the degree of defective filling, molding conditional setting can be done semi-automatically. With second setting process B completed, injection molding machine 1 can produce molded products with reasonably improved quality.

Subsequently, in the third setting process C, injection molding is performed according to the molding conditions obtained from the second setting process B, and molding conditions are adjusted based on the molded product obtained. In this case, the third setting process includes an adjusting process to adjust injection speed V or injection pressure P in the injection process in multi-steps speed or pressure and if the operator can locate the position of defective filling and judge the degree of this failure, the setting of mold condition can be effected semi-automatically. In the third setting process C, adjustment of mold condition is implemented in a manner that the best quality molded products may be provided in, wherein a qualitative final decision regarding quality is made.

Thus, even an unskilled operator is allowed to easily undertake setting of mold condition without fail for injection molding machine 1, using a set of molds 2 whose specifications data are unclear while, semi-automatic setting of mold condition can be realized.

BRIEF DESCRIPTION OF THE DRAWINGS

FIGS. 3(a) and 3(b) are typical sections of the heating cylinder, showing the screw position when performing the second setting process according to the method of the present invention.

FIG. 4 is a characteristic illustrative graph to describe the procedure of setting mold condition in the second setting process according to the method of the present invention.

FIG. 12 is a pattern diagram of the keyboard, an input unit which is used setting in the third setting process according to the method of the present invention.

FIGS. 13(a), 13(b) and 13(c) are injection speed setting characteristic diagrams to describe the third setting process according to the method of the present invention.

DETAILED DESCRIPTION OF THE PREFERRED EMBODIMENTS

Next, preferred embodiments of the present invention are described in detail hereunder with reference to the accompanying drawings.

Figure 2:
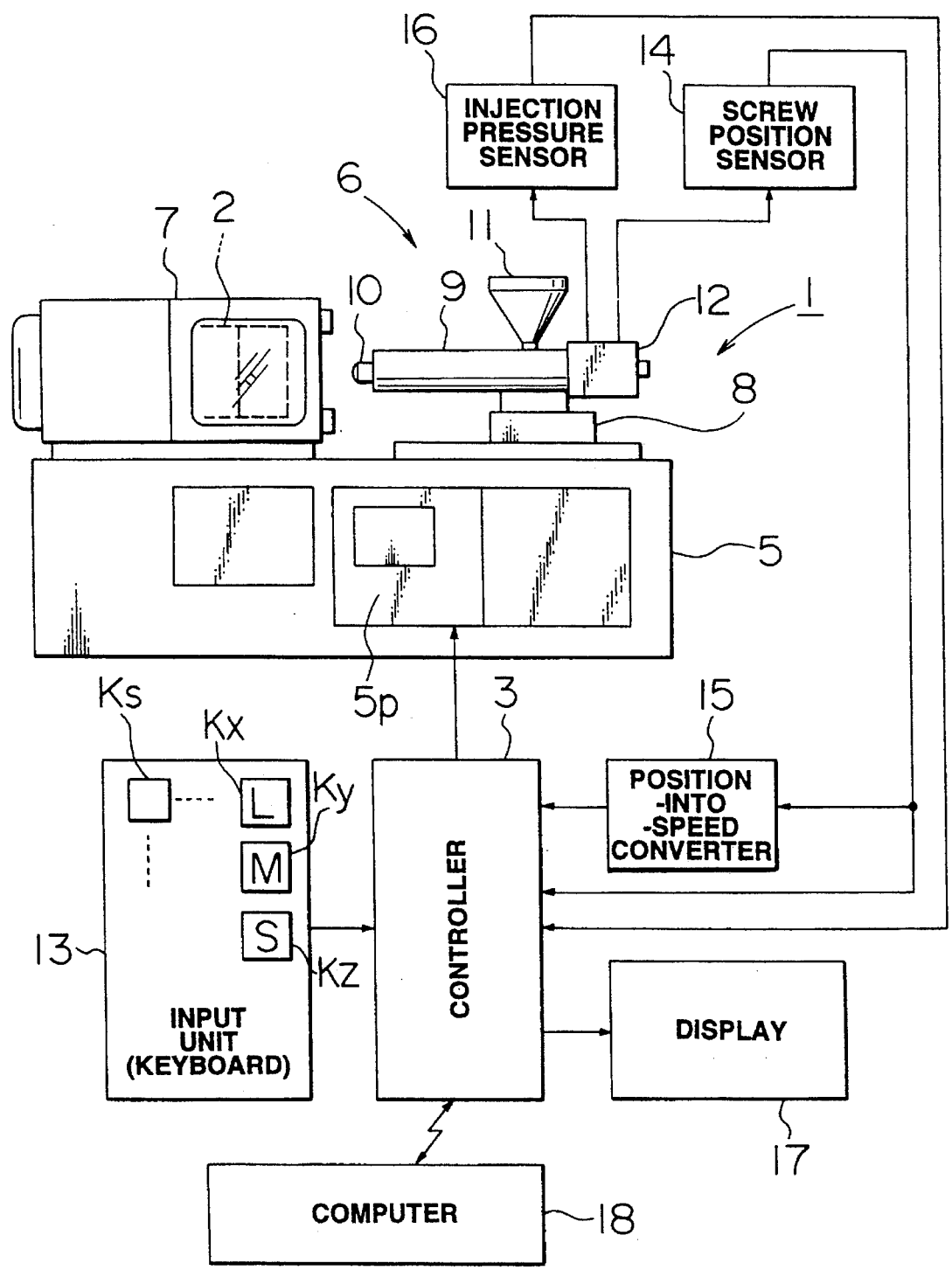
FIG. 2 is a block diagram illustrating the constitution of the injection molding machine to which the method of the present invention is applicable.
Figure 5:
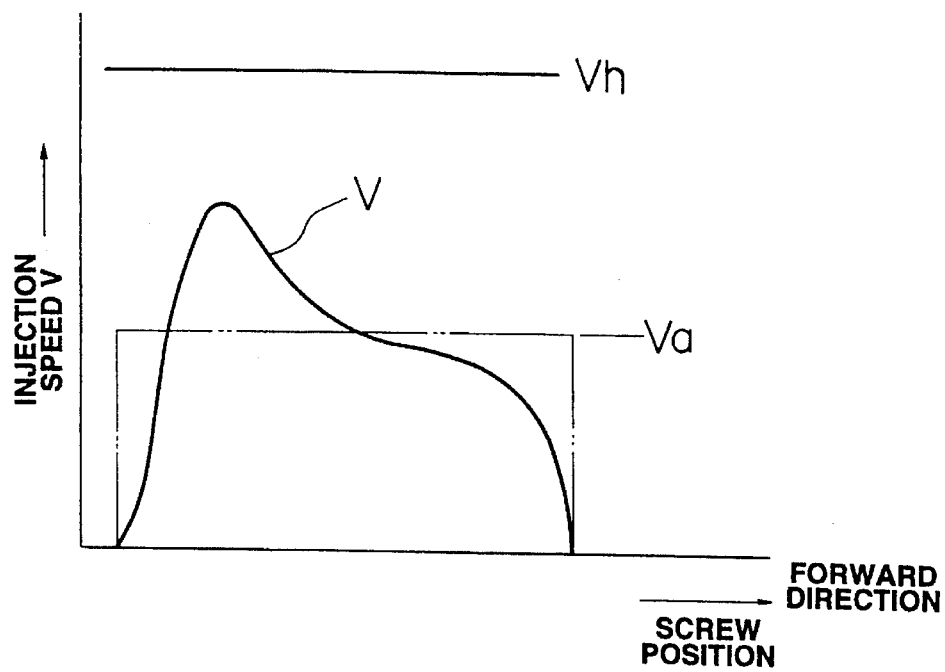
FIG. 5 is an illustrative graph of injection speed characteristic to describe the procedure of injection speed setting in the second setting process according to the method of the present invention.
Figure 6:
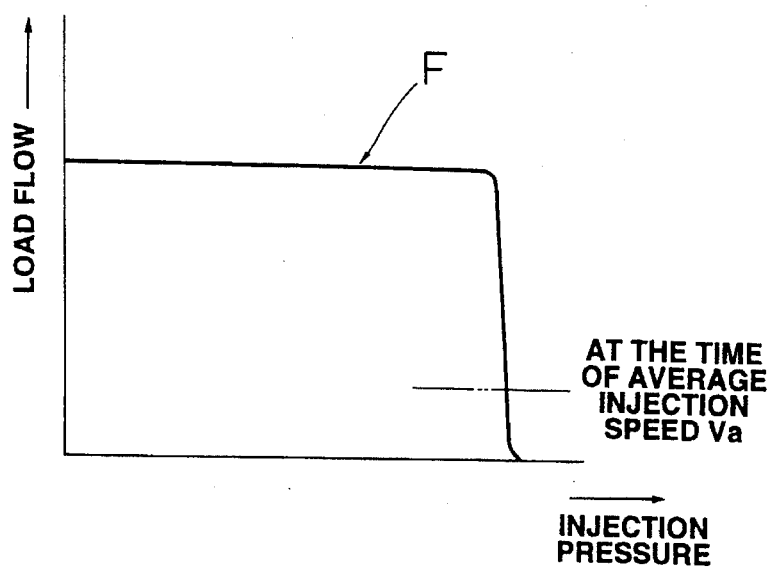
FIG. 6 is an override characteristic diagram of a hydraulic oil pump to describe the procedure of injection speed setting in the second setting procedure according to the method of the present invention.

First, referring to FIG. 2, a description is made of an approximate constitution of injection molding machine 1 to which the method of the present invention is applicable, which relates to this preferred embodiment.

Injection molding machine 1 includes base 5; injection unit 6 is mounted on one side of the top surface of base 5 while a mold 2 concealed by safety cover 7 and whose specifications data are unknown is installed on the other side. In this case, mold 2 is supported by a mold clamping unit (not shown), and injection unit 6 is moved back and forth by injection unit drive 8. Injection unit 6 includes heating cylinder 9 which is provided with injection nozzle 10 at the fore end, and hopper 11 at the rear end while heating cylinder 9 incorporates screw 4 (see FIG. 3). Meanwhile, at the rear end of heating cylinder 9, there is installed screw drive 12 which turns and moves back and forth screw 4. For screw drive 12, a motor drive type using a servo motor and a hydraulic drive type having a hydraulic circuit are known.

On the other hand, in the FIG. 2, 3 refers to a controller housed within said base 5, performing the entire control of injection molding machine 1. 13 denotes an input unit (keyboard) mounted on a side panel 5p of base 5 and coupled to controller 3. Both input unit 13 and controller 3 are furnished with respective functions for setting various molding conditions. 14 refers to screw position sensor which, for example, when the screw drive is of the motor drive type, a rotary encoder to detect the revolutions of a servo motor can be used while when said drive is of the hydraulic drive type, a linear scale, etc. are applicable which directly detect the screw position. Screw position sensor 14 is coupled directly to controller 3 while, said sensor is also connected to controller 3 via speed converter 15. Speed converter 15 has a function of converting into a screw speed signal of the screw by differentiating the screw position signal from screw position sensor 14.

Meanwhile, 16 stands for an injection pressure sensor; in case for example, the screw drive is of the motor drive type a load cell can be utilized, which detects the back pressure working at the rear end of screw 3, and when the screw drive is of the hydraulic drive type, a hydraulic pressure sensor, and so forth to detect the pressure of a hydraulic cylinder is usable. 17 stands for a display mounted on side panel 5p, which presents various information serving also as an auxiliary unit of said input unit 13. Controller 3 is coupled to system computer 18 by way of an optical or a radio communication cable system.

Next, referring to FIGS. 1 through 14, the method of setting molding condition to which the present invention relates is described.

Figure 1:
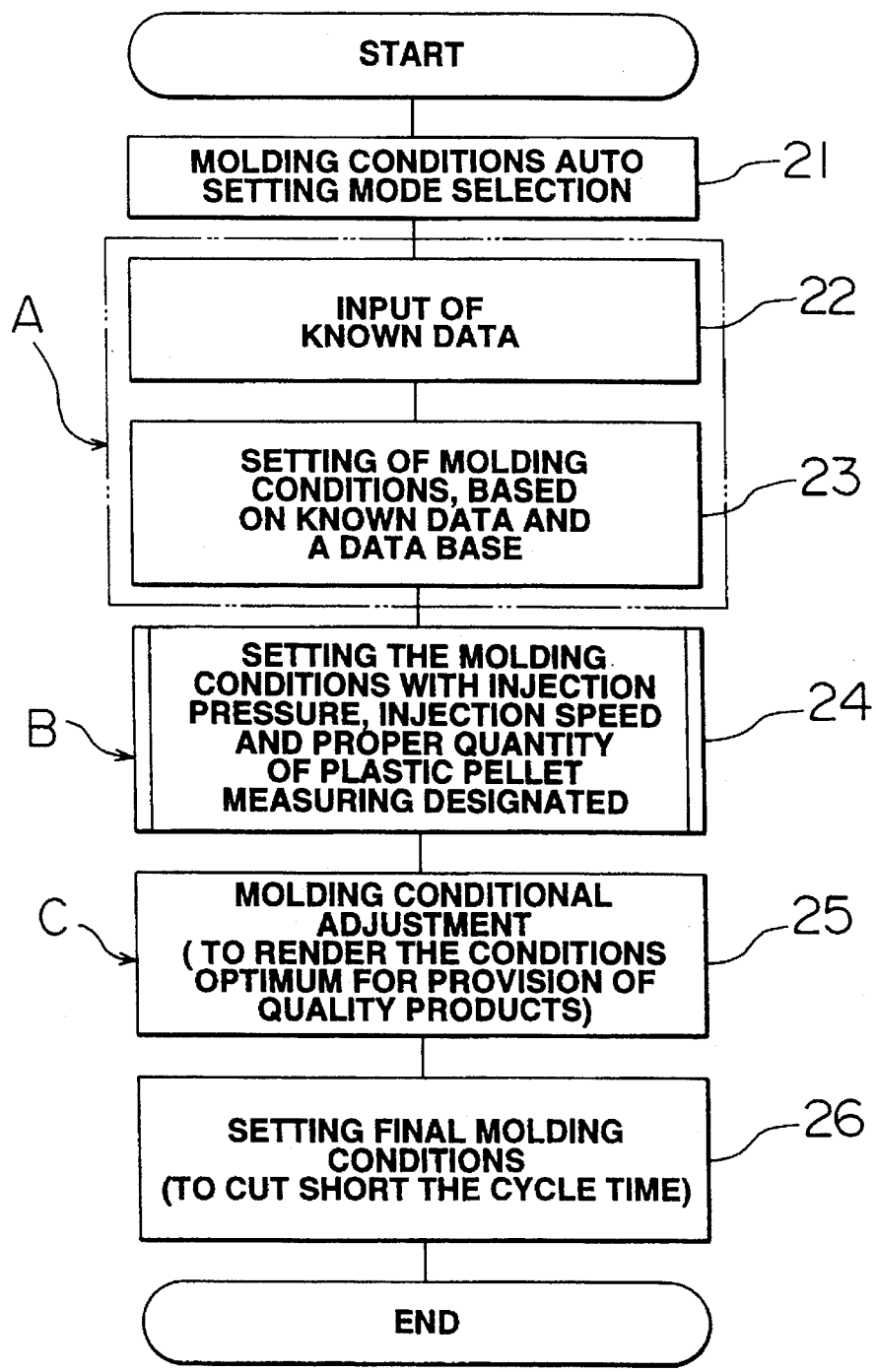
FIG. 1 is a flowchart showing the sequence of mold conditions setting according to the method to which the present invention relates.

FIG. 1 is a flowchart showing the total setting sequence of molding condition to which the present invention relates.

First, prior to the setting of molding condition, an automatic setting mode of molding condition is selected by pressing selector key Ks of input unit 13 (step 21). Then, the setting of molding conditions based on the first setting process A is performed. At first, using input unit 13 and display 17, the known data concerning kind of material, screw specifications, etc. are inputted (step 22). In the controller 3, there is stored a data base concerning characteristics of materials, specifications of injection molding machine performance, basic molding conditions, etc. Then, the molding conditions relative to temperatures and basic molding conditions such as maximum screw stroke, etc. are set in controller 3 according to the known data inputted and the data base stored in the controller memory (step 23). Meanwhile, the molding conditions regarding temperatures, namely heating cylinder and mold temperatures are automatically selected, following the kind of material selected for injection molding. When the first setting process A is over, the setting of molding conditions based on the second setting process B is performed (step 24).

Next, the setting sequence of the molding conditions in the second setting process B is described, referring to FIGS. 3 through 11. First, with reference to FIG. 7, initial molding conditions are set (step 31). The setting of initial molding conditions is done according to a flowchart given in FIG. 8.

At first, the injection speed as injection condition is set at one speed value Vh, on the higher speed side (step 51). In this case, Vh, a value on the higher speed side is in a zone of speed higher than the intermediate speed specified in the speed setting range of an injection molding machine to be used. Preferably, the injection speed over 90% of the maximum injection speed is selected. Further, the injection start position of screw 3 is set to rearmost retreat position Xb (step 52). In this case, rearmost retreat position Xb is not a complete retreat limit position but includes a further rearward optional position behind said position Xb, sufficient for unit measurement of plastic. Further, the injection pressure is set at one pressure value on the lower pressure side Pb, side (step 53). In this case, Pb, a value on the lower pressure side is in a zone of pressure lower than the intermediate point of the pressure setting range of this injection molding machine. Preferably, Pb is selected at the reading under 30% of the maximum injection pressure. In addition to the above settings when setting initial molding conditions, other necessary items such as holding pressure changeover position, back pressure, cooling time, screw turning speed, and so forth (step 54) are set.

Also, setpoint Vs of screw speed and setpoint Ts of time are selected to detect screw injection finish position Xf of 4. Said setpoint Vs of speed refers to a threshold of injection speed V to detect the end of plastic filling, which can be set at approximately a stationary state or several meters/sec. Setpoint Ts of time refers to a duration which is necessary for securing more reliable plastic filling. Ts can be set, for example, at approximately several seconds.

Next, the screw back pressure is turned off (0) to perform measuring (step 32). In this case, screw 4 is moved back to rearmost retreat position Xb as shown in FIG. 3(a). Then, when the semi-automatic setting mode of molding condition is selected, injection unit 6 (with injection nozzle 10) starts advancing (steps 33, 34). Pressing the nozzle touch switch starts the injection. In other words, screw 4 moves forward according to the selected initial molding conditions, followed by injecting molten plastic L into molds 2 (step 35). At this time, controller 3 monitors injection speed V at the time of filling obtained from the speed converter 15. As shown in FIG. 4, when molten plastic is in the middle of filling into mold 2, injection speed V is much higher than setpoint Vs of speed, and when the filling of molten plastic L has ended of injection speed V quickly lowers to less than setpoint Vs of speed. Therefore, in monitoring injection speed V, if injection speed V is found less than setpoint Vs of speed, the controller starts to count the setpoint Ts of time (steps 36, 37). And when the count reaches setpoint Ts of time, injection finish position Xf is monitored (steps 38, 39) thereat.

In this case, by setting setpoint Ps of pressure as a threshold, the controller may monitor injection pressure P obtained from injection pressure sensor 16. Namely, as already mentioned, when the molten plastic L is in the middle of filling into the mold 2, injection pressure P is much lower than setpoint Ps of pressure. Therefore, when the filling of molten plastic L has ended an abrupt increase of pressure to more than setpoint Ps of pressure will result. Accordingly, when injection pressure P reaches setpoint Ps of pressure, the injection finish position Xf can be detected likewise above.

Next, the injection pressure is altered (step 40). The step of altering the injection pressure is aimed primarily to boost the injection pressure (one injection pressure) selected previously at a value on the low pressure side up to an adequate value. The altering sequence of the injection pressure is illustrated in a flowchart of FIG. 9.

At this stage, first, the back pressure is turned on, and measuring is effected in a state given with back pressure, and subsequently, injection unit 6 (injection nozzle 10) is moved back, followed by opening dies 2 (steps 61, 62, 63). Then, the molded product just ejected from the machine is judged whether or not there exists a defective filling to gather necessary data such as wall thickness of the product, gate pressure and so on for example (step 64). With the data relative to the product's wall thickness and the gate pressure, the time required to cool the molds is calculated automatically.

Meanwhile, input unit 13 is provided with selector keys Kx, Ky, Kz (see FIG. 2) capable to select ranks (on the of kind and degree of defective filling) while plural magnitudes of change each corresponding to one of respective rank of defective filling are designated previously in controller 3 to alter the injection pressure in steps with a view to eliminate defective filling.

Figure 10:
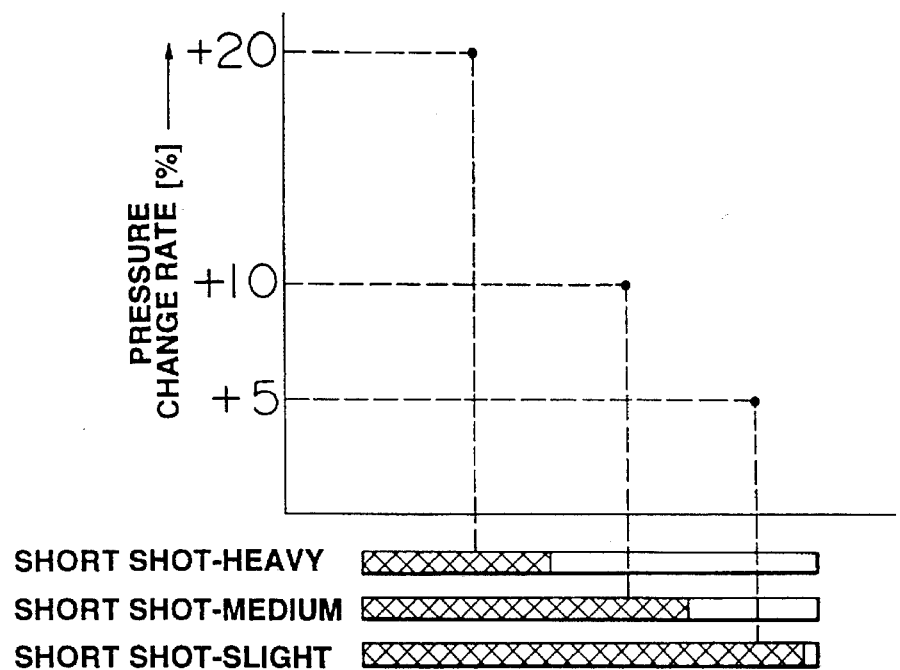
FIG. 10 is a principle illustrative diagram to describe how to change the injection pressure in the second setting process according to the method of the present invention.

For example, when the defective filling is due to a short shot of molten plastic, as shown in FIG. 10, the degree of the short shot is classified into three ranks "heavy," "medium" and "slight," wherein for "heavy," the pressure change rate (magnitude of change) is selected at +20% in reference to the maximum injection pressure, for "medium", the pressure change rate at +10%, and for "slight," the pressure change rate at +5%. In this case, although the degrees of defective filling have been divided into three ranks of "heavy," "medium" and "slight" these ranks may be expressed digitally. In the case quoted above, as an amount of change, a pressure change rate is applied because normally, the injection pressure is set with a rate against the maximum injection pressure. Therefore, as a degree of a short shot, when the rank of "heavy" is selected a pressure change rate of +20% is selected, with the currently set injection pressure being added with 20% the maximum injection pressure. As in the foregoing, the magnitude of injection pressure change may be specified as an absolute quantity or a ratio. Further, the magnitude of injection pressure change may be calculated through addition, and subtraction, or division or multiplication therewith.

Figure 11:
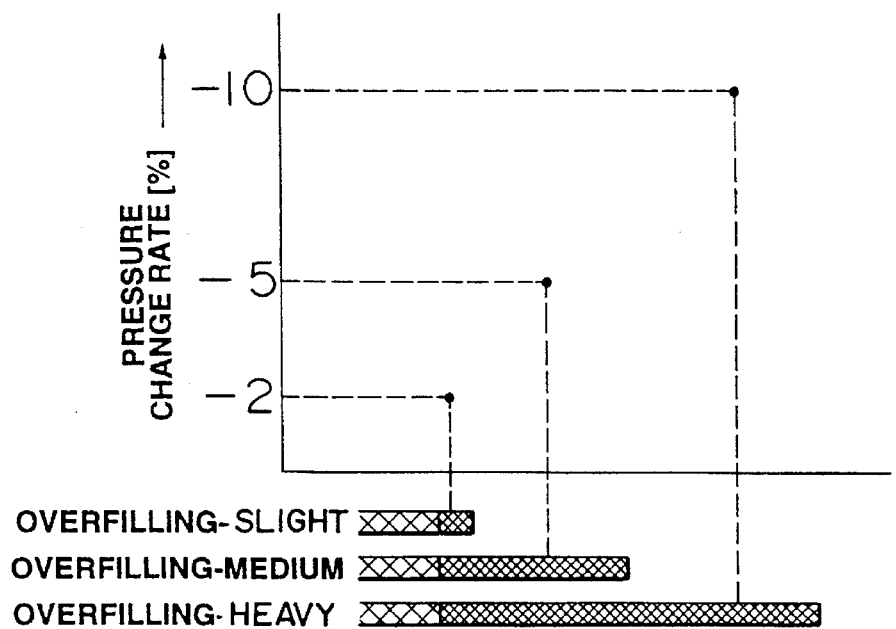
FIG. 11 is another principle illustrative diagram to describe the method of changing the injection pressure in the second setting process according to the method of the present invention.

Further, in the case of overfilling, as shown in FIG. 11, the degree of overfilling is classified into three ranks "heavy", "medium" and "slight" likewise the above. When the degree of overfilling is "slight," a pressure change rate of −2% is selected while for "medium", a pressure change rate of −5% is chosen and for "heavy," a pressure change rate of −10% is selected respectively. As in the foregoing, the pressure change rate is selected incrementally in response to the larger degree of defective filling.

Figure 9:
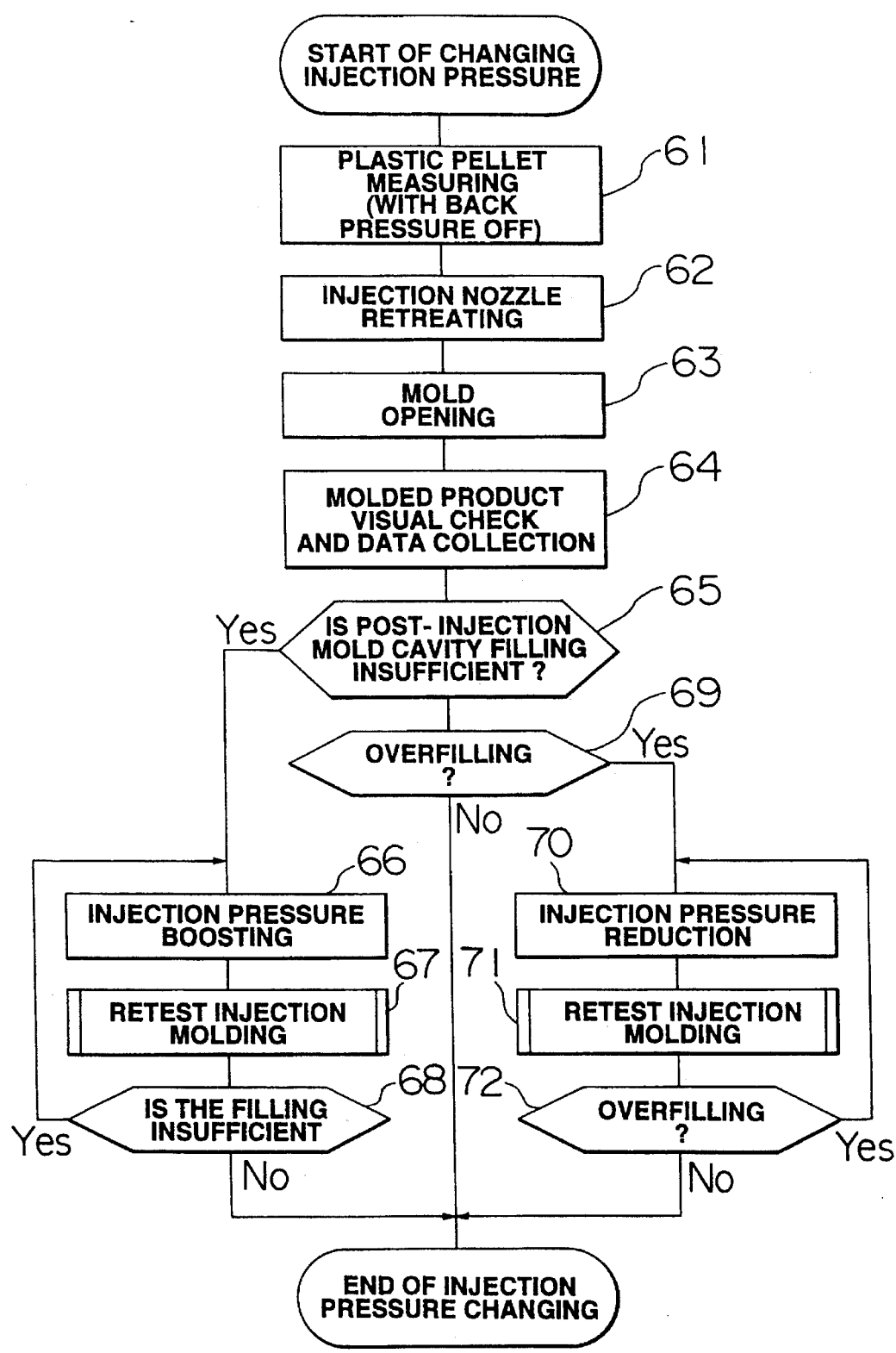
FIG. 9 is a flowchart showing the sequence of changing the injection pressure in the second setting process according to the method of the present invention.

Therefore, when short shot stemming from insufficient filling is found by visual check of a molded product, the injection pressure is increased (steps 65, 66). Namely, if the degree of detected short shot is "heavy" for example, corresponding selector key Kx of input unit 13 may be pressed. Because the injection pressure is being set at one pressure value Pb, on the lower pressure side as the initial molding conditions in this case, if Pd has previously been selected at 20%, controller 3 adds 20% of the pressure change rate to the injection pressure 20%, altering injection pressure P to 40%. Thereafter, using the altered (increased) injection pressure, is resumed. Namely, a remolding cycle prescribed in the process comprising steps 34–40 in FIG. 7 and steps 61–64 in FIG. 9 is started (step 67). Thereafter when the product molded shows again a short shot, the injection pressure is further raised likewise above. For example, when the short shot is ranked "medium", the current injection pressure is boosted as much as 10% of the pressure change rate and remolding cycle is started. The respective pressure change rates are different from one another and are so selected as to correspond to larger degree of defective filling. Therefore, when repeating a remolding cycle after altering the injection pressure, selected ranks will become gradually lower, resulting finally in quality molded products (step 68).

Meanwhile, when there is a finding of defective filling, in the form of burr due to overfilling, a process to decrease injection pressure is performed (steps 69, 70). In this case, by judging the degree of overfilling, if the degree of overfilling is "slight," one of the selector keys of input unit 13 is pressed, whereby controller 3 subtract 2% of the pressure change rate from the current injection pressure. Subsequently, using the newly set (reduced) injection pressure, a remolding cycle is repeated until the machine becomes capable of producing quality molded products (steps 71, 72).

When quality molded products are finally available, controller 3 reads from screw position sensor 14 the then injection finish position Xf, and calculates not only the extent of injection stroke Si ($S_i = X_b - X_f$) from detected injection finish position Xf and rearmost retreat position Xb, but also the measurement Md by adding pre-selected cushion stroke Sc to said calculated injection stroke Si. Then, measurement Md just obtained is set in controller 3 as a molding condition (step 41).

Figure 7:
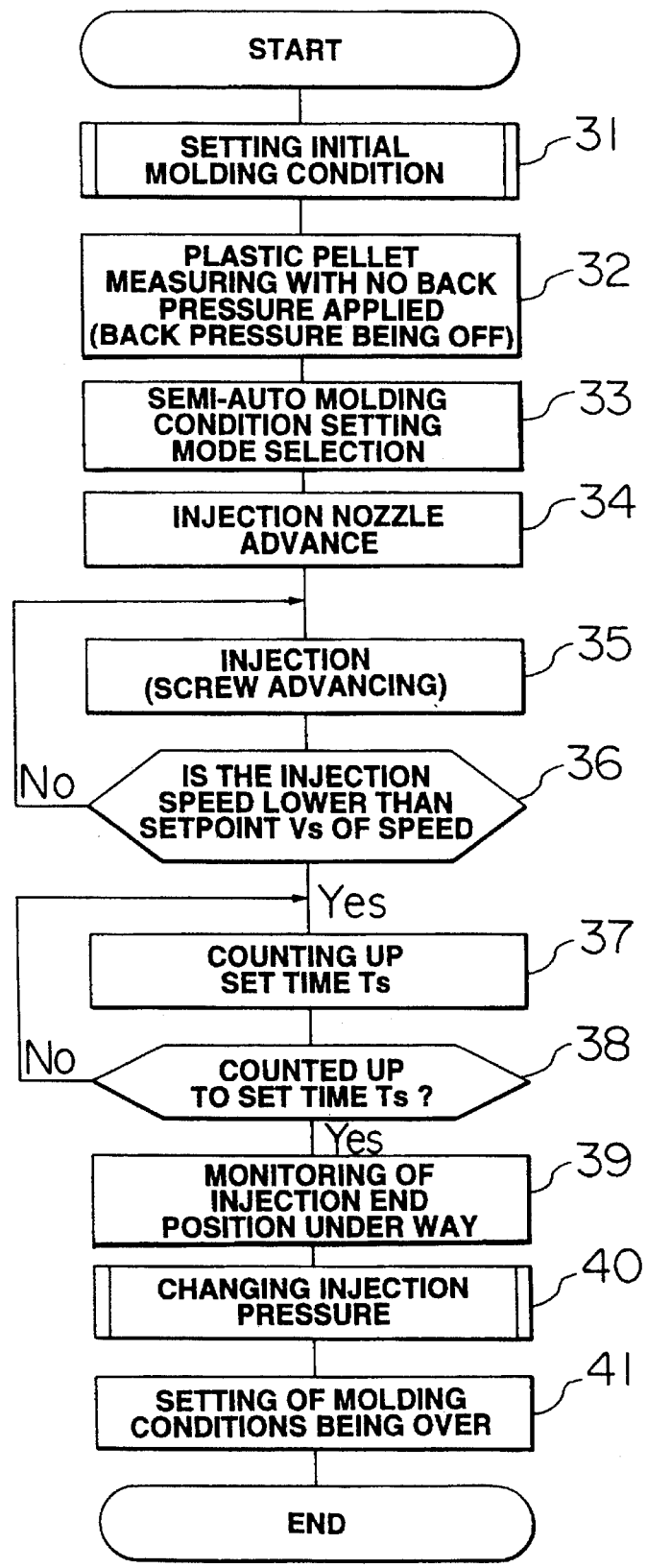
FIG. 7 is a flowchart showing the setting sequence of molding condition in the second setting process according to the method of the present invention.
Figure 8:
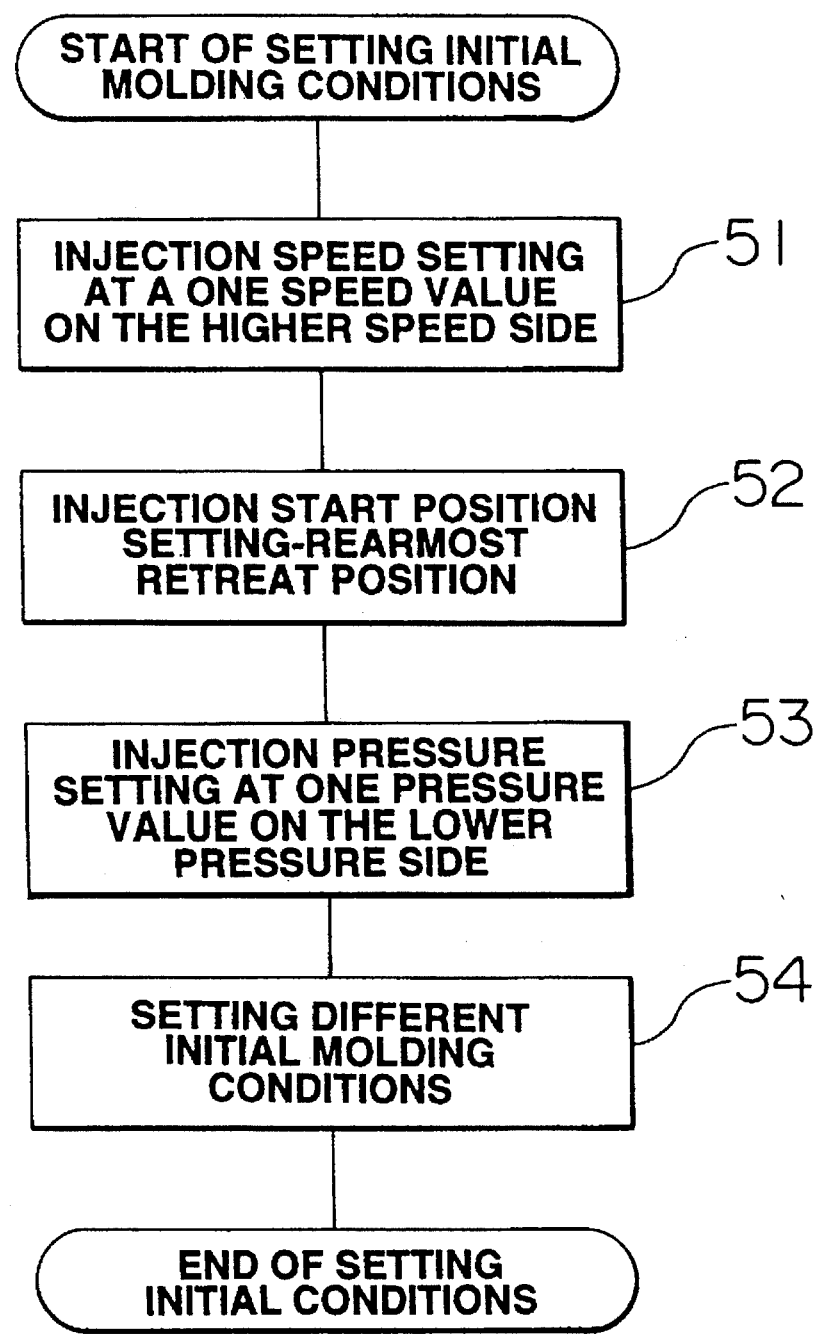
FIG. 8 is a flowchart showing the setting sequence of initial mold condition in the second setting process according to the method of the present invention.

Further, the molding conditions duly workable are obtained with injection pressure P and injection speed V designated which have finally produced quality molded products, and the molding conditions thus obtained are set in controller 3 (step 41). In this case, average injection speed Va prevailing during injection stroke Si and at which quality molded products become available is calculated. In other words, the injection speed V, due to initial molding conditions, is set at one speed Vh, a value on the higher speed side. However, as shown in FIG. 7, in the actual injection molding the injection speed becomes substantially smaller than designated injection pressure V. Therefore, average injection speed Va is calculated, which is then set into controller 3 as a molding condition. In this case, average injection speed Va may be obtained either by dividing the sum of respective injection speeds Vn sampled at prescribed short time intervals with the number of samplings or by calculating area of velocity characteristics in reference to a position of screw 4, with this calculated area being divided with the position.

On the other hand, injection pressure P is set by adding a pressure correction value. Meanwhile, injection speed V is set at in one speed value Vh, on the higher speed side due to initial molding conditions and is set after being averaged. Therefore, average injection speed Va is smaller than Vh, a value of injection speed selected in the setting of initial molding conditions. To stabilize average injection speed Va becoming smaller than initially selected injection speed Vh, a prescribed overdrive pressure is added to the injection pressure as a correction pressure taking into account the pressure fluctuations in response to override characteristic F of a proportional pump, etc. shown in FIG. 6, to set the average injection speed. With the above steps, the setting of molding conditions based on the second setting process B, is over.

Next, the setting of molding conditions based on the third setting process C, is performed (step 25). In the third setting process C, test injection molding is performed according to the molding conditions obtained through the second setting process B while said molding conditions are adjusted based on the products molded. The adjustment in this case is made, basically under the same principle as applied for injection pressure changing process described above. The difference is that in the former process, the injection pressure or the injection speed is set at one pressure, or speed value without being adjusted value, whereby it is difficult to totally eliminate a locally emerging defect of the molded product, with no alternative but to accept those molded products exhibiting a relatively most favorable state as quality products however, the adjustment undertaken in third setting process C is characterized by fine adjustment which is made, paying attention to the filling process in the cycle of injection, in unit of filling process to the molding conditions (injection speed or injection pressure) regarding altered one speed value injection speed or injection pressure of or one pressure value, to obtain best quality molded products. Therefore, to be more concrete, with said fine adjustment, in third setting process C, the injection speed is adjusted in multi-step, multi-speed and the injection pressure is adjusted in multi-steps multi-pressure.

Shown in FIG. 12 is a part of the keyboard provided for input unit 13, K1, K2, K3, ... stand for a plurality of selector keys to select the kinds of defective fillings, K7, K8, K9 are other selector keys to specify the filling process during which the occurrence of defective filling has occurred. In case with the present preferred embodiment, the failures of filling are categorically specified, using respective selector keys: K1 to designate "burrs"; K2 "short shot"; K3 "sink (shrink) mark"; K4 "jetting"; K5 "crack"; and K6 "flow mark." In addition to these selector keys, the keyboard is further provided with the following selector keys to designate as filling processes, K7 to specify "runner"; K8 "midway of filling"; and K9 "last stage of filling." K0 is a selector key to specify the case wherein no failure occurred.

Figure 14:
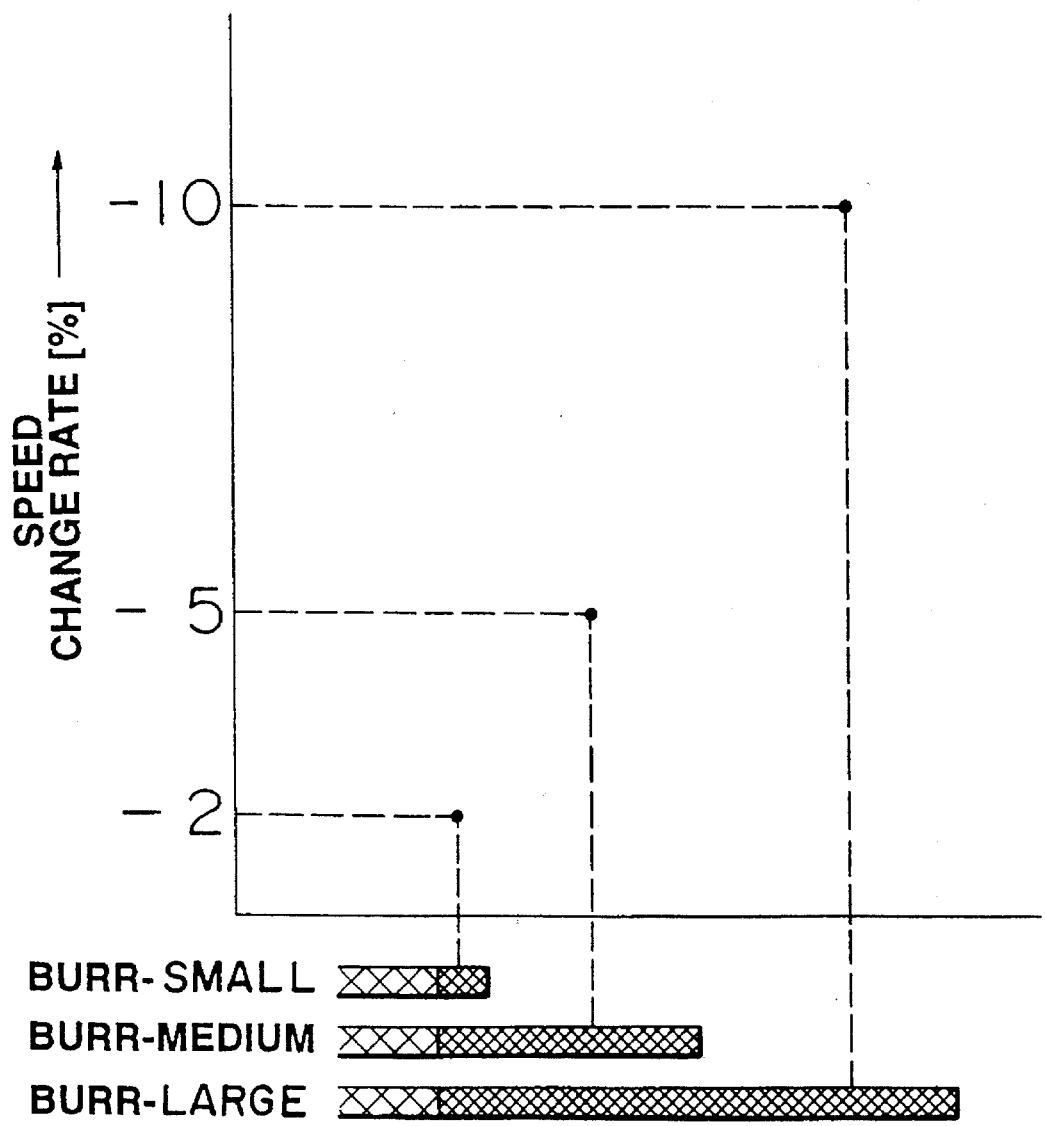
FIG. 14 is a principle illustrative diagram to describe how to change the injection speed in the third setting process according to the method of the present invention.

Further, for every king of defective filling, ranking corresponding to each of different degrees of defective filling and each amount of change corresponding to said ranking are set using input unit 13 and controller 3. In a manner that the respective amounts of change become larger corresponding to larger degree rankings. In this case, if the defective filling is a burr, for example, the extent of burrs is classified into respective ranking of "large", "medium" and "small." In the present embodiment, as shown in FIG. 12, Ka key corresponds to "large", Kb key to "medium" and Kc to "small." Further as illustrated in FIG. 14, for the case of "large" burrs, the speed change rate (amount of change) is selected at −10%, for "medium" burrs, said rate at −5%, and for "small burrs, said rate at −2% respectively. As a matter of course, the ranking of "large", "medium" and "small" may be expressed digitally. The present invention used the rate of speed change for the amount of change because, normally, the injection speed is set with a rate of maximum injection speed. Therefore, when "large" is selected, 10% is subtracted from the injection speed. In this way, the amount of change may be set either in absolute quantity or a percentage, or may be set by means of addition/subtraction or multiplication/division to the injection speed.

Also, controller 3 has a function of changing selected molding conditions of filling process with the amount of change corresponding to the kinds and rankings of selected defective filling.

Below, the sequence of adjustment process is described in detail. First, when molding is performed according to the molding conditions obtained through the second setting process B, a first molded product is obtained, and a visual check thereof is performed. In this case, if a burr caused by overfilling is found, for example, at a certain part of the molded product, when the operator judges the burr from its location that the burr was generated at the "last stage of filling" and assesses the burr to be in the rank of "large," it suffices that he presses selector keys K1, K9 and Ka, whereby in controller 3, the amount of change corresponding to the selected rank of "large" and which is equivalent to a speed change rate of −10% shown in FIG. 14 is selected, and the injection speed for the corresponding to that of filling process in the "last stage of filling" is decreased subsequently as much as 10%." In other words, assuming that one speed value of injection speed V, after being altered, was selected at 50% of the maximum injection speed, as shown in FIG. 13 (a), average injection speed Va for the filling process in the "last stage of filling" is altered to 40% as shown in FIG. 13 (b).

Then, injection molding is performed again with decreased injection speed Va, and when the product molded from said injection molding is found with burrs, the newly selected injection speed is further reduced. If the rank of burrs found with the molded product is appraised to fall into a lower rank of "medium", Kb key on the keyboard of input unit 13 is pressed, whereby in controller 3, the amount of change corresponding to the rank of "medium", namely, a speed change rate of −5% is selected, and injection speed Vb calculated by subtracting 5% is selected as shown in FIG. 13 (c). Therefore, injection molding, using the injection speed altered for the filling process in the "last stage of filling", may be repeated until burrs will disappear completely. In this case, the respective amounts of change provided for adjustment are different and are arranged in a gradual sequence in a manner that the larger the defective filling, the larger is the amount of change. Therefore, repeating remolding will gradually lower the ranks of defective filling, resulting eventually in a total elimination of burrs generating in the "last stage of filling".

It is preferred that, as shown in FIG. 12, display 17 presents the injection speed characteristic in reference to a screw position, and especially, the display is for double presentation of pre-adjustment injection speed characteristic Ea and post-adjustment injection speed characteristic Eb, whereby the display may provide auxiliary service to help the operator perform adjustment with more ease and reliability.

When the foregoing setting processes have been completed, adjustments such as reducing the injection molding cycle time, etc. are performed to set finally, the obtained molding conditions in the controller (step 26).

One preferred embodiment of the present invention has been described. It is however understood that the present invention is by no means limited only to this embodiment. In the above embodiment, one aspect of setting molding condition through injection speed adjustment is exemplified but molding condition setting is also applicable to injection pressure. The constitutional details, method, etc. of the present invention can be modified or altered optionally without deviating from the spirit and scope of the present invention.

We claim:

1. A method of setting molding conditions for an injection molding machine using a set of molds whose specifications data are unclear, said method comprising:

a first setting process wherein, by inputting known data into a controller, the molding conditions are set based on stored data in a data base and said known data, wherein said first process includes a sub-process of setting the molding conditions relative to temperature by inputting data concerning a kind of material into said controller as said known data;

a second setting process wherein injection molding is effected according to pre-selected molding conditions including injection pressure, injection speed and injection screw start position, and based on a molded product obtained, the injection speed is changed, and new molding conditions concerning injection pressure, injection speed and pre-feed unit measurement of plastic are set, wherein said second process performs molding by setting, as prescribed conditions, the injection pressure at one value on a lower pressure side, the injection speed at one value on a higher speed side, and the injection screw start position at a rearmost retreat position, respectively; and a third setting process wherein injection molding is performed according to the molding conditions selected in said second setting process, followed by adjusting said molding conditions, based on the product just molded, whereby final molding conditions are set.

2. The method of setting molding conditions for injection molding machine as claimed in claim 1, wherein said second setting process, by increasing the injection pressure in response to the degree of filling with the product molded according to prescribed molding conditions, the magnitude of injection pressure proper to produce quality molded products is obtained, with addition or subtraction of a correction value of pressure involved with the change of injection pressure to set the injection pressure thus obtained as a molding condition.

3. The method of setting molding conditions for an injection molding machine as claimed in claim 1, wherein in response to the degree of defective filling of the product just molded according to said prescribed molding conditions, the injection pressure is altered as much as a pre-selected amount of change, and remolding molding cycle is continued with said altered injection pressure until quality molded products are obtained.

4. The method of setting molding conditions for an injection molding machine as claimed in claim 2, wherein the correction value of pressure is selected based on the fluctuation of injection pressure depending on the override characteristic of a drive unit providing the injection pressure.

5. The method of setting molding conditions for an injection molding machine as claimed in claim 1, wherein said second setting process, by calculating average injection pressure from the screw's injection stroke which is proven to provide quality molded products, and also from the injection speed changing during a period of this injection stroke, sets the calculated injection speed as a molding condition.

6. The method of setting molding conditions for an injection molding machine as claimed in claim 5, wherein the screw's injection end position at which the injection speed proven to provide quality molded products becomes less than the pre-selected setpoint of speed is detected, whereby a proper injection stroke is calculated from the difference between said detected screw's injection end position and the rearmost retreat position.

7. The method of setting molding conditions for an injection molding machine as claimed in claim 6, wherein the injection end position is detected upon the expiration of a pre-selected time after the injection speed declines below a setpoint of speed.

8. The method of setting molding conditions for an injection molding machine as claimed in claim 1, wherein said second setting process by calculating injection stroke from the injection end position and the rearmost retreat position and obtaining measurement value with a pre-selected cushion stroke added to said calculated injection stroke, sets the measurement value thus obtained as a molding condition.

9. The method of setting molding conditions for an injection molding machine as claimed in claim 1, wherein said third setting process includes a sub-process of adjustment to adjust the injection speed or pressure in multi-step multi-speed.

10. The method of setting molding conditions for an injection molding machine as claimed in claim 9, wherein said sub-process of adjustment selects, among pre-selected plural different filling processes, a filling process in which defective filling has occurred, and subsequently alters the injection speed or pressure of selected filling process.

11. The method of setting molding conditions for an injection molding machine as claimed in claim 10, wherein the injection speed or pressure is altered as much as a pre-selected amount of change, and remolding cycle is repeated with said altered injection speed or pressure until defective filling completely disappear.

12. The method of setting molding conditions for an injection molding machine as claimed in claim 5, wherein the screw's injection end position at which the injection pressure proven to provide quality molded products becomes less than the pre-selected setpoint of pressure is detected, whereby a proper injection stroke is calculated from the difference between said detected screw's injection end position and the rearmost retreat position.

13. The method of setting molding conditions for an injection molding machine as claimed in claim 6, wherein the injection end position is detected upon the expiration of a pre-selected time after the injection pressure goes up to more than a setpoint of pressure.

* * * * *